United States Patent [19]

Mueller

[11] Patent Number: 4,747,048

[45] Date of Patent: May 24, 1988

[54] METHOD AND APPARATUS FOR PREVENTING PERFORMANCE OF A CRITICAL OPERATION UNLESS SELECTED CONTROL CONDITIONS ARE SATISFIED

[75] Inventor: Joseph E. Mueller, Loveland, Colo.

[73] Assignee: Hewlett-Packard Company, Palo Alto, Calif.

[21] Appl. No.: 842,508

[22] Filed: Mar. 21, 1986

[51] Int. Cl.$^4$ .............................................. G06F 15/46
[52] U.S. Cl. .................................................... 364/300
[58] Field of Search ........................................ 364/300

[56] References Cited

U.S. PATENT DOCUMENTS 4,628,434 12/1986 Tashiro et al. .................. 364/300 X

*Primary Examiner*—Raulfe B. Zache
*Attorney, Agent, or Firm*—Edward L. Miller

[57] ABSTRACT

An embedded control system executed by a microprocessor prevents, the performance of a critical operation unless selected control conditions are properly satisfied. A polite request to perform the critical operation may require the setting of various multi-bit flags indicative of a normal polite entry and does require the issuance of a uniquely identifiable action. A protection circuit distinguishes the uniquely identifiable action and initiates checks of the control conditions. These control conditions may include not only the values of the various multi-bit flags, but other checks indicative of normal operation. If the controlling conditions are met a confirmation stimulus, precisely timed relative to the uniquely identifiable action, satisfies the protection circuit, which then enables the appropriate hardware to perform the critical operation. The protection circuit monitors various signals of the embedded system, and any of a variety events, if detected, will immediately terminate the enablement of the critical operation. These principles are applied to the protection of calibration constants stored in the non-volatile memory of a digital multimeter controlled by an embedded system.

16 Claims, 9 Drawing Sheets

METHOD AND APPARATUS FOR PREVENTING PERFORMANCE OF A CRITICAL OPERATION UNLESS SELECTED CONTROL CONDITIONS ARE SATISFIED

BACKGROUND OF THE INVENTION

Increasing numbers of industrial and consumer appliances, as well as measuring laboratory apparatus and electronic test equipment, are incorporating microprocessors. The intent in such applications is generally not to provide a capability to run programs such as can be done on programmable calculators and desktop computers. Instead, the designer is often replacing dedicated control circuitry with "smarts." The use of a microprocessor to control an instrument or an appliance can often make it work as well or better with fewer discrete components, make it work better than was previously possible, or make feasible new operational features that would otherwise be impractical or impossible. A microprocessor, its memory and I/O circuits used in an instrument or an appliance for these or related purposes is sometimes called an embedded system. It is in that sense that the term "embedded system" is used in this Specification.

Embedded systems may be used to control the actuation of an operation or process whose performance is to be subordinated to certain control conditions. The control conditions could pertain to ensuring human safety, preventing damage to equipment, preventing erroneous or misleading outcomes, or merely avoiding inconvenience. We shall refer to an operation receiving protection through such controlling conditions as a "critical" operation. Certain problems can arise when a microprocessor is used in the control of a critical operation. In one sense the microprocessor itself may be more complex than the system it is used to control. Certain failure modes peculiar to the microprocessor can raise questions about its "trustworthiness." It would be desirable if the advantages of the microprocessor's powerful processing capability could be made available without at the same time increasing the vulnerability of the system to miscontrol of the critical operation arising out of increased system complexity. The techniques described herein help attain that goal.

As an example, consider a hypothetical microwave oven having a button to push for turning on the oven. The designer would like to make very sure that no microwave energy will be generated unless the door is shut. It is common for some sort of electro-mechanical power interlock to be relied upon for this assurance. And while that is a generally acceptable solution, it requires additional discrete components that are subject to possible reliability problems. It is an attractive alternative to sense the status of the door with a low power but inherently very reliable device (perhaps magnetic or optical) and use the microprocessor to decide whether or not to apply power.

As an additional example, consider how embedded systems have changed electronic test equipment. Increasing numbers of electronic measuring instruments are incorporating microprocessors and relying for their accuracy upon calibration information stored in non-volatile Read/Write Memory (RWM). The stored calibration information can often be changed from the front panel during a calibration procedure. To meet the demands of various government regulations for defense contractors and to assist those in charge of electronic maintenance, a security code mechanism can be employed to minimize the likelihood that the calibration information will be deliberately altered by an unauthorized person or inadvertently altered by an unskilled user of the instrument.

Both of the above examples also lend themselves to illustrating instances of "trustworthiness" problems that can arise when using embedded systems. In the case of the calibration constants stored in non-volatile memory, it is appropriate to consider how to protect that information from the microprocessor itself. Suppose it gets "zapped" with a static discharge and temporarily runs amok. Might not a traumatized microprocessor become a fox in the chicken coop, and without warning, destroy or alter valuable calibration data costing time and money to replace? And what of the subsequent problems caused by inaccurate measurements unknowingly thought to be accurate? It would be desirable if the calibration information could be protected against alteration except under well defined and controlled circumstances that are unquestionably valid.

Consider again the microwave oven with an embedded system controlling the generation of microwave power. If a traumatized microprocessor began to execute code at random there is a certain probability that it will energize the magnetron even though the door is open. All that is required is that execution begin after the check for the door and ahead of the energizing of the magnetron.

Additional checks in the firmware cannot, by themselves, avoid these difficulties. If there is a section of code that, when executed, turns on the magnetron or writes to the area of memory that holds calibration constants, then the basic vulnerability is present. All that is required is for the program pointer in the microprocessor to land at an address just ahead of the critical instructions. It will then be as if all checks were sucessfully met, since there will be no further opportunity to branch upon detecting their failure; no such detection will be undertaken. This situation is shown in general in FIG. 1.

FIG. 1 shows just one of a plurality of prior art methods of preventing a critical operation unless it is really intended that it be done. Another way is to require that a key be physically fitted to a keylock. Still another is to require that a cover be removed from the instrument and a switch be thrown or a jumper installed or removed. Such methods are generally called "interlocks". Each of these methods has its own disadvantage when used in conjunction with an embedded system. For example, none really addresses the problem of the traumatized or malfunctioning microprocessor while the interlock is disabled during service or routine calibration. They are also subject to failure, can be inconvenient, and are subject to abuse. A key, for example, might always be left in place.

What is needed is a way to ensure that an attempt to perform a critical operation will not be honored unless the execution of the section of code making the attempt is properly and immediately subsequent to successful checks of the appropriate controlling conditions. "Controlling conditions" can include checks to ensure safe operation as well as checks to prevent unauthorized operation.

SUMMARY OF THE INVENTION

The invention may be summarized as follows. First, the embedded system determines that a protected critical operation is to be attempted. Should there be more than one such operation, it may set flags or other indicators to indicate which protected critical operation(s) is (are) to be performed. Such flags or other indicators may be simple one-bit values or complex patterns of many bits compounded of words at different addresses and perhaps even in separate memory chips. The latter technique will be discussed in detail, later. For now, the conventional meaning of the term "flag" will be adaquate, while bearing in mind that it may also include "other indicators", as just described. Even if there is but one critical operation that may be chosen, it is still of advantage to set a flag indicating that this is indeed a "polite" request, as will be discussed later. If there are calibration constants to be found or computed or other preliminary work that can be done, then this is done at this time. For example, a security code could be checked now, or the new calibration constants simply determined, but not yet stored into the protected region of memory. Following these preliminaries it is of advantage, but not essential, to check the preliminary activity for reasonableness and set another flag indicating normal conclusion of preliminaries. (For example, are the calibration constants within certain expected limits?) At this point the requesting section of code takes a uniquely identifiable action that: (a) forces the microprocessor to begin execution from a known address, and (b) serves to start a particular time interval.

There are at least three ways to realize the uniquely identifiable action mentioned above. Of these the preferred action is to cause a deliberate reset of the microprocessor. This is easily done in that only a single signal need be generated to actually perform the reset. A variety of ways are available to a microprocessor for causing its own deliberate reset. A reset certainly causes the microprocessor to begin execution from a known spot in the code, and it certainly is a publicly monitorable event that can serve as the initial point of a time interval. A reset has a further advantage in that it guarantees that the internal status of the microprocessor is normal, by forcing all of its internal state machines into known permissible conditions. While this won't heal a broken microprocessor, it may correct misbehavior that arises from those state machines getting into forbidden conditions through some sort of trauma.

A self-administered reset may not be convenient or practical in some systems. A second (and perhaps less disruptive) way to accomplish (a) and (b) above is to substitute a self-administered interrupt for the deliberate reset. A third way is to simply decode the fact that there has been an instruction fetch from a particular address. Whichever technique is used, the uniquely identifiable action identifies the start of a time interval monitored by a protection circuit. In the discussion that follows it will be assumed that the uniquely identifiable event was a self-administered deliberate reset.

Immediately following the deliberate reset the microprocessor begins to execute from ROM code that first checks the flags. If they are both set (or if there is only one, if it is set), and if a power supply monitor circuit indicates that the reason for the reset was not a result of turning on the power (implying that there was the deliberate program-initiated reset described above), then power-on initialization is avoided in favor of attempting the protected critical operation. If there is more than one protected critical operation the flags may indicate the appropriate section of code to execute. In each appropriate section of code is the actual test of controlling conditions followed immediately by the issuance of one or more instructions to actually accomplish the designated protected critical operation.

The section of code testing the controlling conditions might be straight assembly language assembled into machine code, or it might be instructions to be executed by a virtual machine that is part of the embedded system. For example, a virtual machine might incorporate operation codes and operands, similar to the "quasi-compiled" format of interpreted BASIC. Alternatively, it might use a tree-like structure of addresses for execution by threaded interpreter, such as is used in FORTH. Either way, if a virtual machine is used it is then possible to check the values of certain key elements of the virtual machine to ascertain that it has not gone wacko owing to some randomly executed code blundered into by a traumatized microprocessor. We shall call such a verification a "sanity check". If it can reasonably be assured that the hardware of the microprocessor is not traumatized and that the virtual machine is healthy, then it is possible to proceed in ways that promote great confidence that the critical operation will not be performed unless the controlling conditions are in fact checked successfully immediately prior to the operation.

Once successfully past the test(s) for the controlling condition(s) in the above-mentioned appropriate section of code a confirmation instruction is issued, followed by an instruction to actually do the protected critical operation. A protection circuit observes (among other things) the time interval between the deliberate reset and the confirmation instruction. If the time interval is not correct (i.e., what is normal for a legitimate operation), then the attempt to perform the critical operation is thwarted by the protection circuit. That is, the protection circuit swallows the critical instruction by refusing to enable an AND gate through which the critical instruction must pass before it can be performed. The protection circuit may also monitor various other conditions of interest and refuse to enable the AND gate if they appear suspicious or deviate from prescribed limits. A wide variety of conditions might apply here. Examples include the presence or absence of interrupt activity, the status of hardware implemented time-out detection circuits, and the like.

Following the conclusion of the protected critical operation the code may issue an instruction to tell the protection circuit to disable the AND gate by making an enable signal false. In an alternative embodiment the protection circuit automatically disables the AND gate after one or a selected number of instances of the controlled critical instruction. In another alternate embodiment the protection circuit, when initially satisfied, simply provides an enable signal for a preselected period of time, during which the protected critical operation is then possible. It will be understood that in any of the embodiments the aforementioned AND gate can be replaced by some equivalent mechanism within the execution of the critical instruction, so long as it is sufficiently reliable and properly responsive to a signal from the protection circuit.

It can be seen, then, that the invention encompasses a way to infer, with great confidence, that immediately prior to attempting the critical operation the appropriate controlling conditions were indeed checked and found satisfactory. The deliberate reset or self-administered interrupt causes the microprocessor to begin execution at the beginning of the software checks of the controlling conditions. The aforementioned decoding of an instruction fetch has the same significance. The act of beginning to execute the code performing the checks that are the controls starts a time interval. A narrow window at the end of the time interval is the only time when the attempt to perform the critical operation can be confirmed as an allowable attempt. Thus, performance of the critical operation is closely coupled to immediately prior successful completion of the checks of the controlling conditions. Failure to successfully pass the checks may "permanently" thwart any attempt to perform the critical operation in a number of ways. For example, the software can jump to the code for a "real" reset (i.e., the power-on routine) or it may issue an instruction to "scare" the protection circuit until some subsequent remedial or restorative action is undertaken.

Plan of the Specification

The subject matter of this disclosure deals with ways to reduce the probability that certain undesirable events will, singly or in combination, cause the uncontrolled execution of a critical operation. A number of such undesirable events can be identified, as well as certain strategies for dealing with them. Because of the probabilistic nature of the subject matter, no single strategy in isolation is entirely effective. Depending upon the specific nature of the embedded system at hand, several different strategies may need to be simultaneously applied to achieve the desired degree of protection.

In this connection an analogy may be helpful. Probabilities combine in the same way as resistances in parallel; the combination is found by forming the reciprocal of the sum of the reciprocals. Suppose that we are trying to preserve a high impedance (high confidence that access to the critical operation is effectively controlled) that is undesireably shunted by a number of stray impedances (probabilities of uncontrolled access to the critical operation). Assume for the sake of argument that all of the impedances are of roughly the same order of magnitude. Then it is clear that not just one, or even most of the stray impedances will have to be eliminated, but rather that all or almost all will need to be eliminated if the desired high impedance is to be preserved.

The disclosure that follows explains a number of cooperating techniques for controlling access to a critical operation. No single one of these is likely to be entirely effective if used in isolation. An actual instance of a high confidence critical operation in an embedded system will likely use several techniques and be supported by complex reasoning, some of which stems from the particulars of the embedded system at hand. To reduce the complexity of the explanation the Specification deliberately takes a gradual approach to obtaining the desired confidence. The techniques discussed in connection with FIGS. 1 and 2 are, by choice, fragmentary. That is, they do not address certain failure modes. But this facilitates both the explanation of what is achieved by those particular techniques, as well as helping identify that which is not achieved. The latter is indeed useful as it serves as a point of departure for further explanations of additional techniques to deal with those "left-overs".

Finally, in connection with FIGS. 3-8 we will examine in some detail one complete scheme for protecting the calibration constants stored in the embedded system of a digital multimeter.

A few further observations are in order before proceeding with a description of a preferred embodiment of the invention. First, although the invention will be described in the context of an embedded system, those who appreciate the techniques used in the invention will understand that those techniques may be applied to other types of processor controlled systems. That is, the invention is not limited to use solely in embedded systems. Next, although we shall often refer to "the microprocessor," it will be understood that this is only illustrative. Any processor or CPU may be used in the practice of the invention. It need not be one that is implemented upon a single (or few number of) integrated circuit(s).

It should be understood that the term "critical operation" is relative. One man's treasure is another's junk, and what is a critical operation in one setting may not be of special interest in another. The actual property that makes an operation "critical" in a particular application is outside the scope of the invention. And lastly, the invention is compatible with a variety of possible ways the critical operation is accomplished as instructions are issued. That is, the enable signal that the protection circuit generates can be just that: an enable signal that if absent prevents some occurrence from being the resulting effect of some cause (an instruction). It does not matter whether the instruction (or instructions) originate with the processor itself or through some agency outside the processor. Either way, the invention provides a reliable way of ensuring that the control conditions are met before the operation is allowed to take effect. An alternate possibility is that the enable signal itself functions as the critical instruction.

DESCRIPTION OF THE PREFERRED EMBODIMENT

Figure 1:
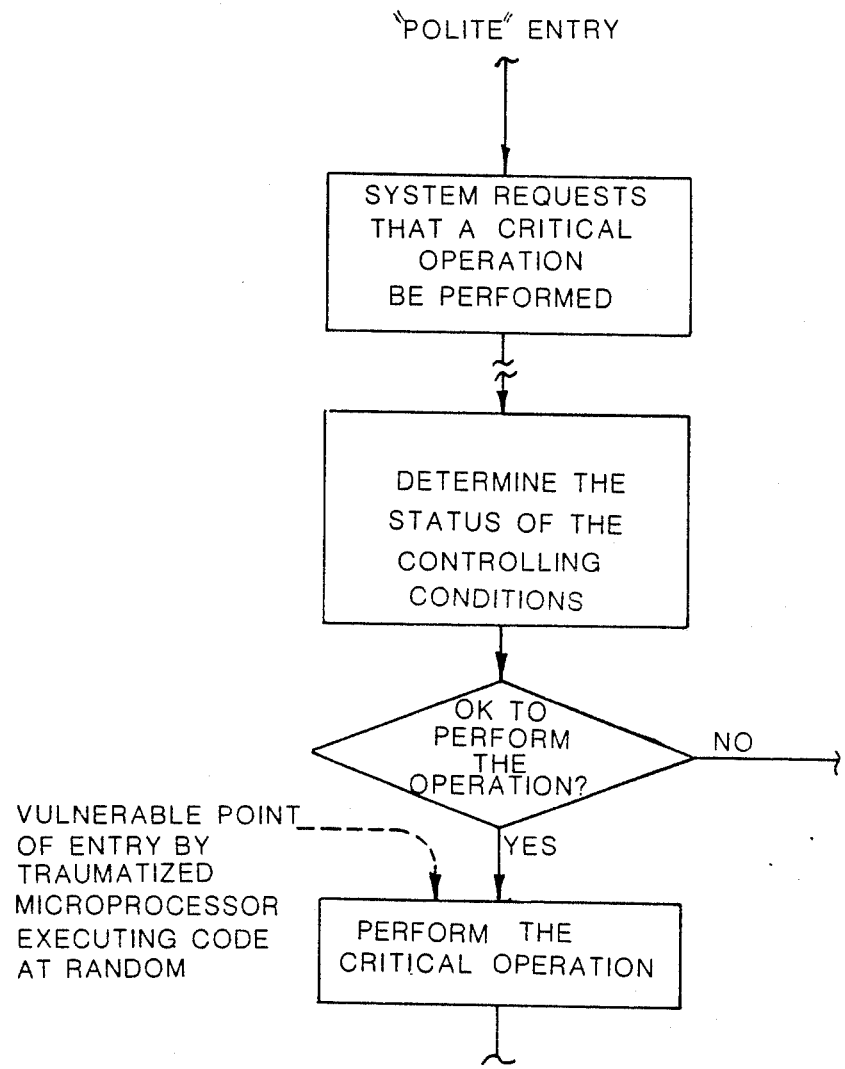
FIG. 1 is a simplified flowchart of a prior art method for protecting a critical operation performed by an embedded system.
Figure 2:
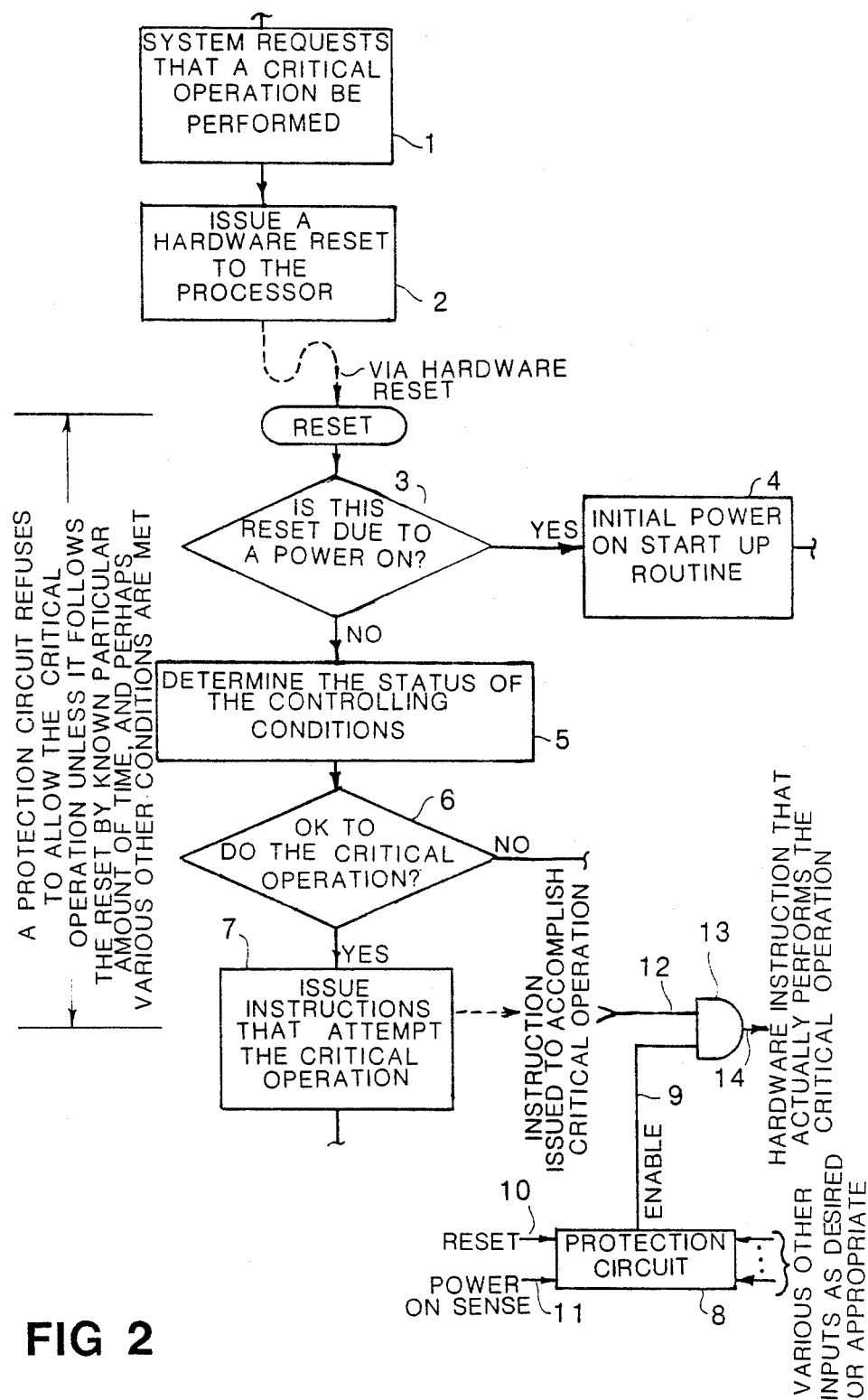
FIG. 2 is a simplified flowchart of a preferred general method for protecting a critical operation performed by an embedded system.

Refer now to FIG. 2, wherein is shown a simplified flowchart and block diagram of one aspect of the invention. It may be assumed that an embedded system in some piece of apparatus (itself not shown) has interpreted some event as a request to perform a protected critical operation. In terms of the previously offered examples this would mean either that the start button had been pushed on the microwave oven, or that an operator had initiated the calibration procedure for the digital voltmeter. This state of affairs is shown in the abstract as state 1 in the flowchart: SYSTEM REQUESTS THAT A CRITICAL OPERATION BE PERFORMED.

At this time certain preliminary activity may or may not be performed. That possibility is discussed in connection with FIG. 3. In principle there need be none, so it is omitted from FIG. 2 to simplify the figure and more clearly show a general principle associated with the invention. Accordingly, the next state 2 in FIG. 2 issues a deliberate reset instruction to the microprocessor of the embedded system. This causes the microprocessor to begin execution afresh at a definite and known place in ROM. This corresponds to state 3 of the flowchart, where the qualifier asked is: IS THIS RESET ACCOMPANIED BY A POWER ON?. That is, was an application of AC power the cause of the reset?. This is determined by circuitry in the power supply which produces an appropriate power-on sense signal 11. The power-on sense signal 11 is tested by code executed by the microprocessor, and if it is determined that the reset is due to an application of power then a branch is made to the INITIAL POWER-ON START-UP ROUTINE 4. From there, execution proceeds with the idle loop or supervisor of the embedded system.

If, however, the reset is not due to an application of AC power, then it is probably the result of having just passed through states 1 and 2 of the flowchart. (We cannot at this point guarantee this, however, since it might also be the result of static zap cum trauma).

If the answer to the qualifier of state 3 is NO, then it appears that the reset stems from state 2. The next state following state 3 is then state 5, where the activity is to: DETERMINE THE STATUS OF THE CONTROLLING CONDITIONS. It is at this point that the state of the door of the microwave oven or the state of any other critical condition is determined. Following immediately is the qualifier of state 6: OK TO DO THE CRITICAL OPERATION?. If the answer is NO, the operation is aborted in any convenient way.

If, however, the answer to the qualifier of state 6 is YES, then state 7 will: ISSUE INSTRUCTIONS THAT ATTEMPT THE CRITICAL OPERATION. This could be one instruction or a whole series, depending upon the nature of the critical operation. It is best if things are arranged so that a single instruction or control line to the hardware can be reliably controlled to enable/disable the critical operation. For the sake of illustration, assume that state 7 issues a single critical instruction 12 that, if disabled, prevents performance of the critical operation. We turn now to how the critical instruction 12 is enabled or disabled.

The final decision as to whether or not to allow the critical operation is made by a "protection circuit" 8 that is responsive to the reset signal 10 and the power-on sense signal 11, and possibly to other signals as well.

In it simplest form the protection circuit 8 responds as described below to instances of the reset signal 10 that are not produced as a result of an application of AC power. The response of the protection circuit 8 is to initiate a preselected time interval upon whose conclusion is generated an enable signal 9. Assuming, as above, that a single instance of a single instruction 12 is what is required to accomplish the critical operation, the enable signal 9 is issued for a short period of time just sufficient to enable an AND gate 13 through which a legitimate critical instruction 12 issued by state 7 will then successfully pass, becoming the instruction 14 that actually performs the critical operation.

In an alternate embodiment the issued instruction 12 may serve as an "unlock" instruction whose successful image 14 sets a latch later cleared by a "lock" instruction, or it may trigger a one shot or a counter that defines a selected automatic time interval beginning with the occurrence of instruction 14. The critical operation would be hardware disabled except during the interval after the "unlock" instruction and before the "lock" instruction, or disabled except during the automatic time interval.

At this point we may pause to consider what degree of protection has been gained for the critical operation, and identify what further steps may be desirable. The principle advantage gained is that it is now less likely that random execution of code by the microprocessor will cause the critical operation. In particular, a random or "impolite" entry into none of states 3, 5, 6 or 7 will succeed in producing the protected operation; there was no deliberate reset and the protection circuit 8 will not enable the production of instruction 14 from instruction 12. Similar remarks apply to the "unlocklock" and automatic time interval alternatives.

The arrangement of FIG. 2 is not vulnerable except for random entries into states 1 or 2, or into any state that subsequently transisitions into state 1 without qualification. Such an occurrence would result in the deliberate hardware reset from state 2, and could enable the production of instruction 14 from instruction 12. This may or may not be a problem, depending the nature of the appliance and the nature of states 5 and 6. In the microwave oven, for example, either of states 5 or 6 might reflect the status of not only the door, but also of whether or not the start button is activated. If the button were not presently pressed then state 6 would prevent random entry into either of states 1 or 2 from causing the critical operation. This may mean that the start button is used twice; once to get into state 1, and again to get into state 7 from states 5 and 6. This would not be a problem, as it would likely take at most a few milliseconds to get from state 1 to state 6. This means that it would be almost impossible for a deliberately pressed button to appear pressed for purposes of transitioning into state 1 but unpressed by the time states 6 and 7 were reached. It should be noted that even if such were the case the result would not be unsafe, merely inconvenient. The important thing to note is that if states 5 and 6 check the right things then random entry into states 1 or 2 need not cause the critical operation.

Figure 3:
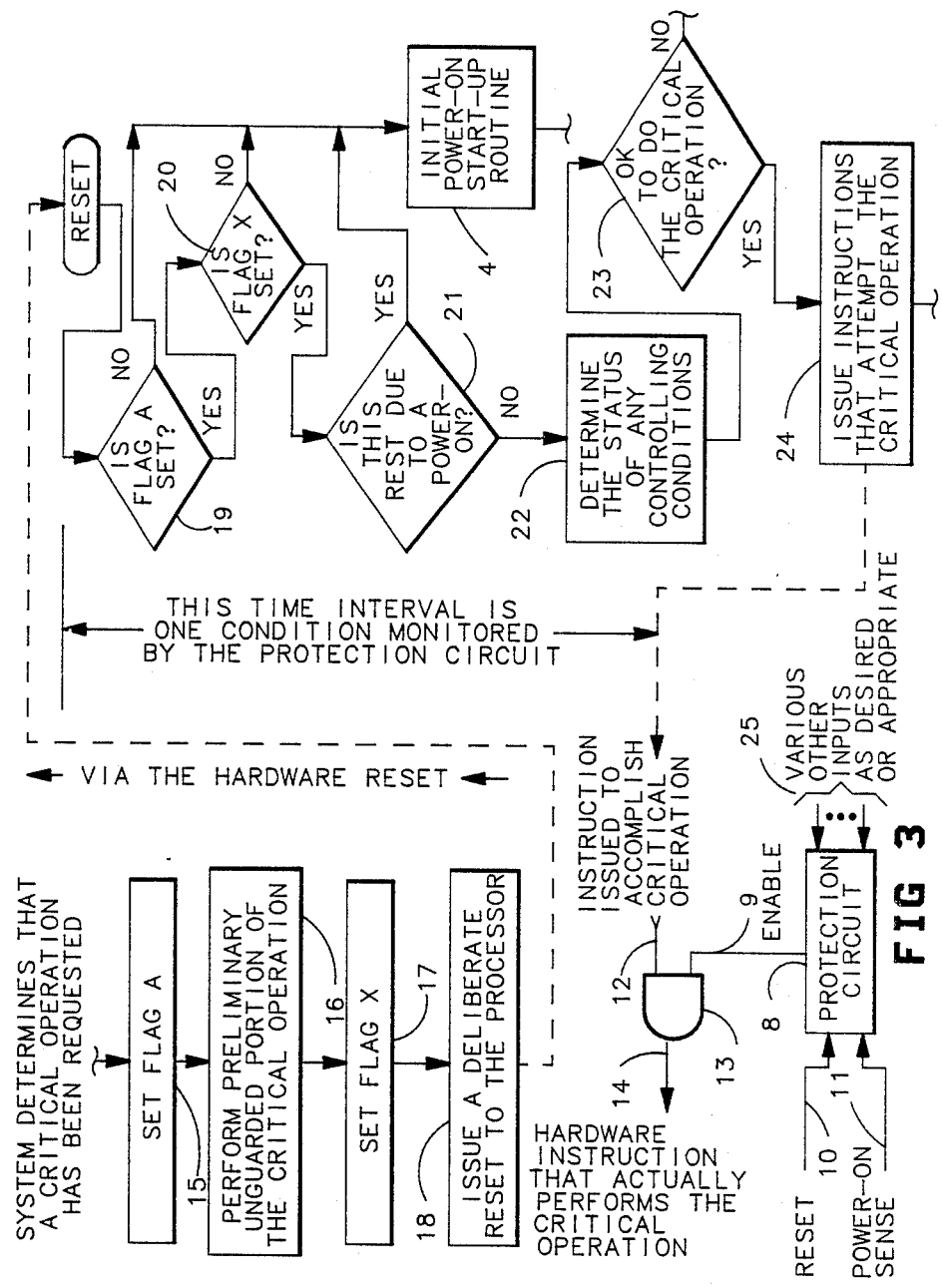
FIG. 3 is a simplified flowchart of a preferred more particular method for protecting a critical operation performed by an embedded system.

One the other hand, it may not be desirable or convenient to directly incorporate certain checks into states 5 and 6, even though it remains desirable to insist that they be accomplished prior to allowing the critical operation. FIG. 3 shows a way to do that.

Referring now to the flowchart of FIG. 3, that flowchart begins subsequent to a determination by the embedded system that a critical operation has been requested. The initial activity is performed by state 15, and is to SET FLAG A. The significance of flag A is that this request or attempt to perform the critical operation is "polite", even though it may not actually be legitimate. (Random execution of code could begin with state 15 of FIG. 3 as easily as anywhere else.) The following state (16) performs any preliminary unguarded (i.e., non-sensitive, but perhaps still very important) activities that ought to precede the critical operation proper. Here, for example, is where a user's security code could be checked. Other checks can include the overall reasonableness of the request, as well as determining the status of any necessary antecedent conditions. In the case of the microwave oven this would include determining if the door were closed. In the case of the protected calibration constants of the digital voltmeter this is where the new values would be found, although not yet actually written in place of the old values. A likely test would be to inspect the new values for any obvious irregularities, such as lying outside of certain predictable limits.

Following successful conclusion of the unguarded preliminaries state 17 sets flag X. This further reinforces the notion of polite entry by indicating a well behaved and polite conclusion of the preliminaries. The next state (18) issues the deliberate reset signal 10 to the microprocessor. State 18 of FIG. 3 corresponds directly to state 2 of FIG. 2.

Upon being reset the microprocessor executes state 19, wherein flag A is checked. If that flag is set then state 20 proceeds to check flag X. If both flags were set then state 21 uses the power-on sense signal 11 to determine the source of the reset, just as described for state 3 of FIG. 2. If either one of flags A or X was not or if the reset was accompanied by an application of AC power, then control transfers to state 4: INITIAL POWER-ON START-UP ROUTINE. Assuming that everyting was indeed polite the latter will not happen, and control will transfer to state 22: DETERMINE THE STATUS OF ANY CONTROLLING CONDITIONS.

States 22, 23 and 24 of FIG. 3 correspond to states 5, 6 and 7 of FIG. 2, and the remarks made about states 5-7 also apply to states 22-24. Likewise, all of the remarks for FIG. 2 pertaining to the protection circuit 8, enable signal 9 and to AND gate 13 also apply to those same elements in FIG. 3. Some additional remarks, however, are also in order.

First, the protection circuit 8 may be responsive to additional inputs 25. What these might be depend upon the specific nature of the embedded system and of the hardware that is being controlled. For example, if the nature of the critical operation is such that redundancy is desired to doubly ensure that some forbidden production of the operation does not take place, additional signals 25 would be one place to implement the redundant checks. In the case of a microwave oven this might entail yet another switch mechanically coupled to the door. Other conditions of interest could be monitored here, too. For example, a temperature sensor on the magnetron could produce an input 25.

Second, while it seems safe to suggest that it is best if states 22, 23 and 24 are brief and adjacent, with no unnecessary intervening activity of another nature, this does not necessarily mean that the time from the deliberate reset signal 10 issued by state 18 to the instruction 12 issued by state 24 (and enabled by enable signal 9 to become instruction 14) should be a short as possibile. In fact, a little intentional delay may be useful. The idea is to put some selected amount of delay in the path through states 19, 20 and 21. This might take the form of several states in a loop wherein a counter is incremented up to a certain value with the sole purpose of killing some time. It may seem that this creates an "exposure" to be avoided. It can indeed create an exposure, and in certain systems that deliberate exposure can be a test that is passed only by the occurrence of proper events on the various other inputs 25 to the protection circuit 8. As an example, during the time interval from the deliberate reset issued in state 18 to the critical instruction 12 issued by state 24 the protection circuit 8 might require that there be no interrupts, or that there be a certain number at certain times. The insertion of delay, then, can serve to make it less likely that a traumatized processor randomly executing code will properly perform the delay, and also provides some time for a harware evaluation of certain potential abnormalities, especially those that might occur only periodically. It also provides time during which another class of checks, called sanity checks, can be performed. We shall have occasion to describe sanity checks in connection with FIG. 4.

Before leaving FIG. 3 we should examine one other possibility. Suppose the embedded system has two or more critical operations. In terms of FIG. 3 this might mean that states 15, 16 and 17 have corresponding other states 15', 16' and 17' wherein flags A' and X' are set and an unguarded portion of the critical operation corresponding thereto is performed. In such a case states 19 and 20 would be supplemented with checks for the other flags, and the overall combination would serve not only as a safeguard, but also as a fan-out mechanism to determine which critical operation to perform. If this were the case it is likely that differing amounts of "time killers" would be located in each leg of the fan-out path, such that the total time from the deliberate reset signal 10 to the issued critical instruction 12 (or its counterpart 12' at the other end of the fan-out) remains constant.

Figure 4:
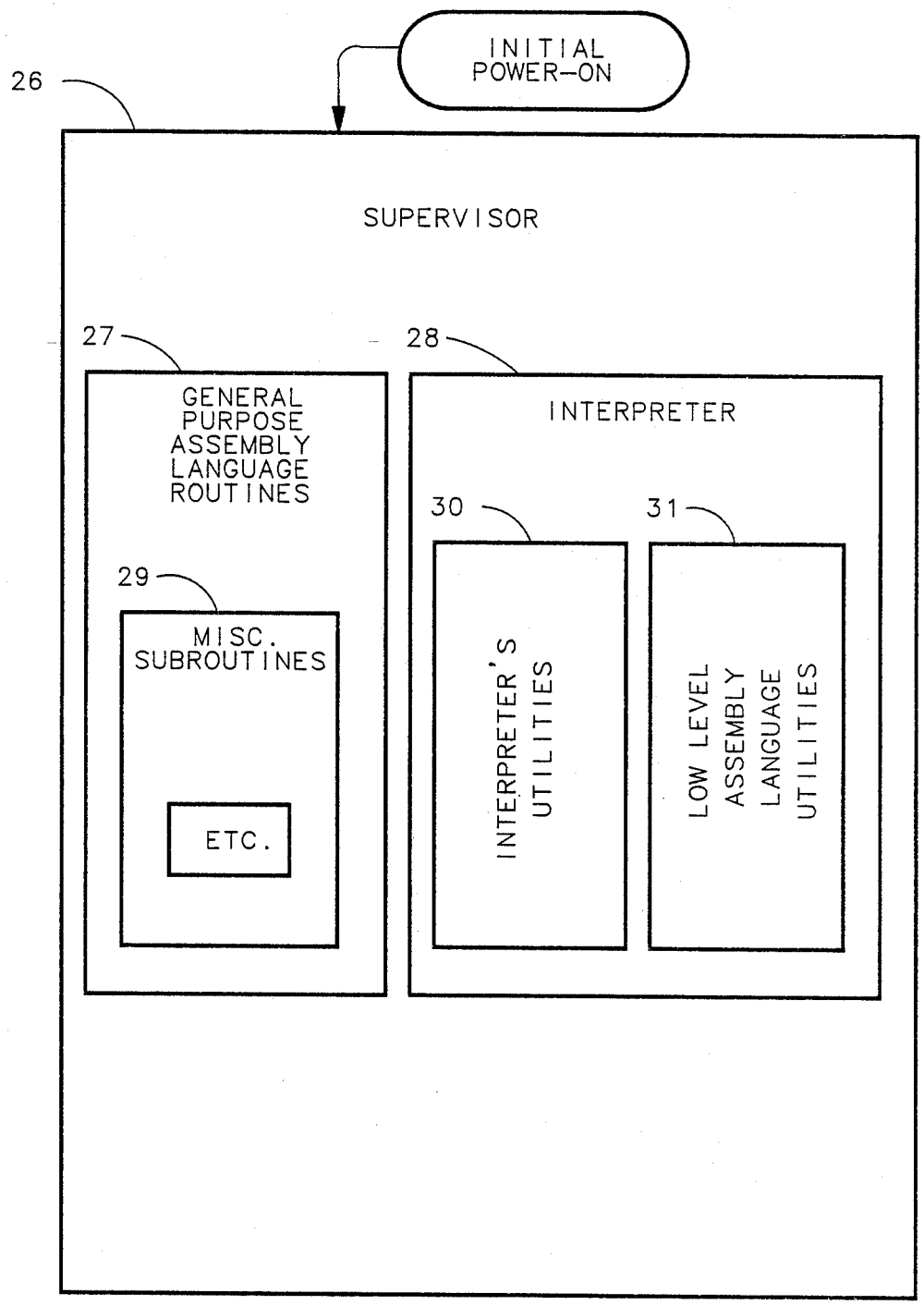
FIG. 4 is a simplified flowchart of a preferred and even more particular method for protecting the calibration constants of a digital multimeter incorporating an embedded system.

Referring now to FIG. 4, there is shown a hierarchial block diagram of a software architecture for an embedded system. The diagram is not meant to be representative of all embedded systems, and although it is appropriate for use with one aspect of the invention, the particular architecture of the diagram is not a necessity. The diagram is inspired by the embedded system of the Hewlett Packard Model 3457A Digital Multimeter, which incorporates various aspects of the invention.

The Hewlett Packard 3457A DMM has on its front panel a keyboard through which a user can indicate that certain tasks (e.g., calibration) are to be performed. Certain critical sub-operations of these tasks are to be protected by the invention. In particular, writing to certain memory addresses containing calibration constants is a critical operation that is to be protected.

Upon conclusion of an initial power-on routine (not itself shown) control is transferred to a supervisor 26. With regard to control of the embedded system, the supervisor is the highest level of abstraction. It parses the user's keystrokes on the keyboard and responds to certain internal events within the device containing the embedded system (i.e., the Hewlett Packard 3457A DMM). According to its needs at the time, the supervisor 26 can invoke various general purpose assembly language routines 27 or an interpreter 28. The general purpose assembly language routines 27 have available a conventional collection of miscellaneous subroutines 29.

The interpreter 28 executes programming that implements many of the tasks recognized by the supervisor 26. In the case of the Hewlett Packard 3457A DMM the interpreter 28 is a FORTH interpreter operating upon output originally produced by a FORTH compiler and currently situated in ROM. The interpreter 28 has at its disposal various interpreter's utilities 30 and some low level assembly language utilities 31.

The diagram of FIG. 4 is not held out as containing anything particularly unusual. It shows that various firmware entities exist in one exemplary embedded system, and shows who can call whom. This has been done to set the stage for the next figure and the accompanying explanation of a certain aspect of the invention that takes advantage of the fact that an interpreter is in use. Whether that interpreter is a FORTH interpreter or not is of no consequence.

We have spoken of the supervisor 26 and the interpreter 28 as if they were wholly independent pieces of machinery. In one sense this appears to be misleading, as everything executable is at root just so much machine code to be executed by the (single) microprocessor. But to adopt this view to the exclusion of all others is give up a powerful tool for organizing and controlling the behavior of a mechanism. It is more satisfactory to view the supervisor 26 and interpreter 28 as virtual machines having at least an abstract existence in their own right. They could in principle be entirely separate physical machines, if that were desired. In terms of the invention the result of that would be a potentially very reliable method of safeguarding a critical operation.

Figure 5A:
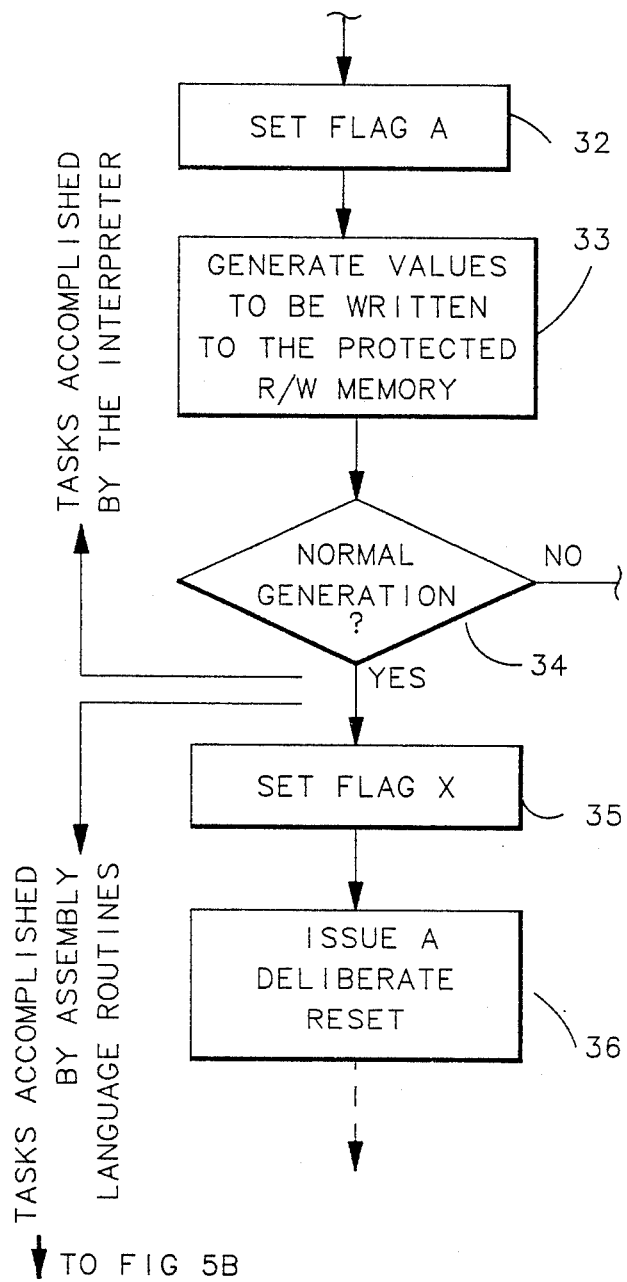
FIGS. 5A-B are a simplified software block diagram of certain organizational aspects of the embedded system for the digital multimeter of FIG. 4.
Figure 5B:
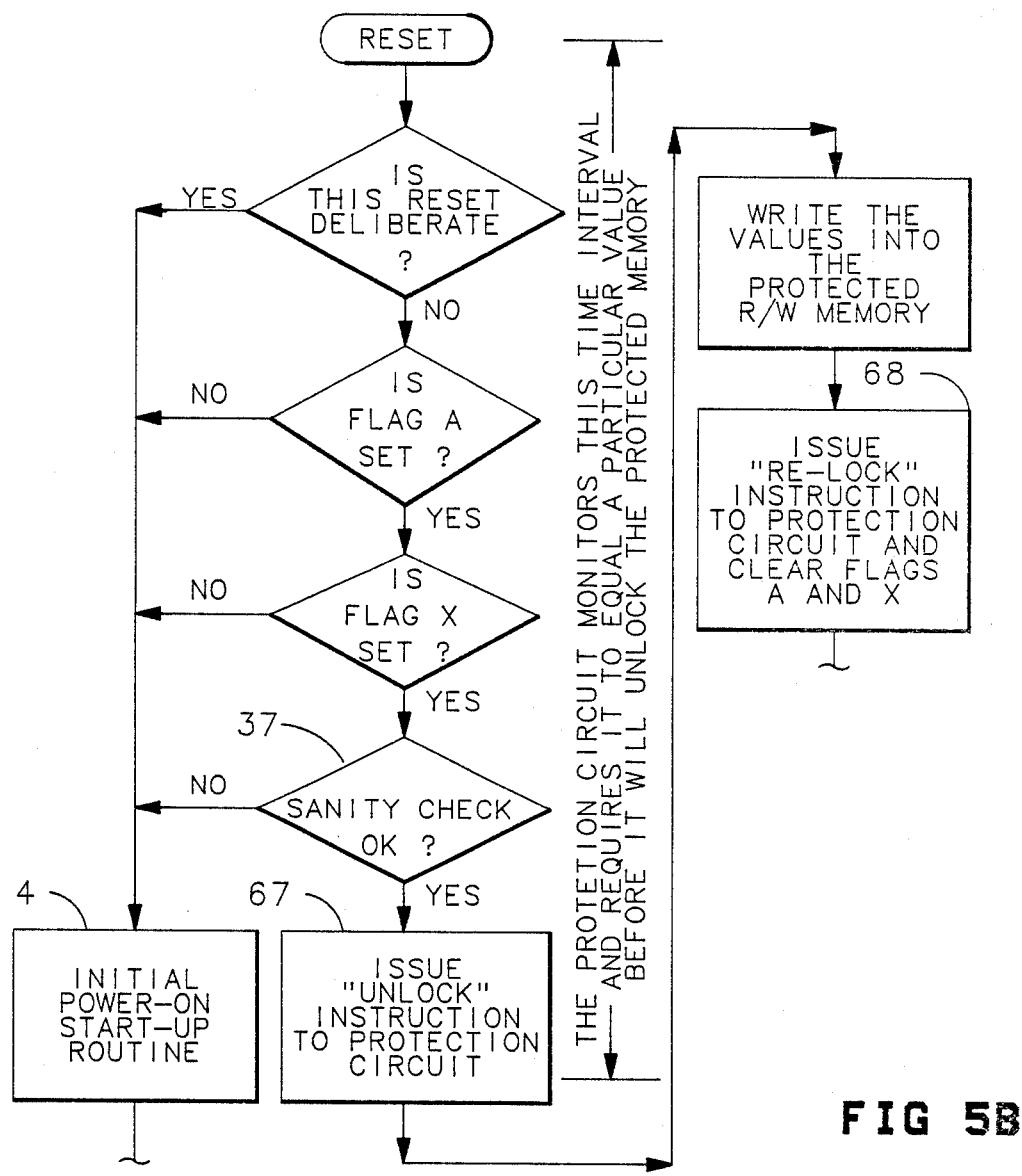

We turn now to FIG. 5. FIG. 5 is a particular instance of the flowchart of FIG. 3 designed to cooperate with the block diagram of the digital multimeter shown in FIG. 6. In the context of the digital multimeter the critical operation to be protected is the writing of values to certain areas in a non-volatile random access read/write memory (RWM). Those protected areas of memory contain calibration information.

When the supervisor 26 determines that the user has initiated the calibration operation the following events are included in the operation of the embedded system of the digital multimeter. As shown in step 32 of the flowchart of FIG. 5, Flag A is set. This indicates that there was a normal polite entry into the calibration process. This does not necessarily mean that the user really requested calibration, but it does indicate that the calibration process was entered from its beginning and not by an abrupt transition into an interior portion. This is sufficient, since subsequent failure of the user to "participate reasonably" in calibration (assuming he didn't request it) will prevent the system from even getting close to enabling the protected critical operation.

Flag A is not a simple one-bit flag. Instead, it is a sixty-four-bit value whose component segments are kept at different addresses in different RAM chips. The effect of this is to render it extremely unlikely that random execution by a sick microprocessor would accidently set Flag A. Of course, it is also possible that a sick microprocessor could blunder into the polite entry point as easily as anyplace else. This might well cause Flag A to successfully be set. Later on we shall have more to say about how such a circumstance can be neutralized.

After Flag A is set the necessary activity 33 to generate the calibration constants is accomplished. The specifics of this operation need not concern us, save to note that there are many possibilities. Presumably this is an interactive procedure requiring user involvement, although it is certainly conceivable that the digital multimeter contains internal standards that are measured automatically. However it is done, it is at this point that the proposed new calibration constants are determined and temporarily stored in an unprotected area of RWM. The old and as yet unchanged previous values remain stored in the protected area of RWM.

The next step 34 in the flowchart of FIG. 5 is to ascertain if the calibration values appear to be the product of a normal generation. This check can be as simple as determining that the proposed values lie within certain preselected "ranges of reasonableness", or as complex as also checking for selected combinations of flags or other status indications within the generation process 33.

Upon satisfactory conclusion of the NORMAL GENERATION check 34 the supervisor 26 causes Flag X to be set. Flag X is another multi-bit compound address entity similar to Flag A. Flags A and X are each cleared upon the execution of the initial power-on start-up routine 4. That routine is executed any time the embeded system is initially turned on or an impolite attempt is made to perform the protected critical operation. Hence there are reasonable grounds at this point in the flowchart of FIG. 5 (having just set Flag X) for assuming that if both Flag A and Flag X are set then the new values have been politely and normally generated according to the flowchart. Having just set Flag X (and on the assumption that Flag A will turn out also to be set) the next thing that is done is to issue the deliberate hardware reset. This is shown as step 36.

There are two things that should be noted before proceeding with the remainder of the flowchart of FIG. 5. First, steps 32, 33 and 34 are accomplished by the interperter 28 of FIG. 4; the balance of the operations are accomplished by assembly language rotuines largely within box 31 of FIG. 4. The interperter 28 is a machine implemented in firmware. Many of its mechanisms require that there be certain cooperating values in RAM (e.g., pointer, counters). While not implying that the interpreter is somehow frail or delicate, a sick microprocessor blundering its way through code in a random fashion would likely scramble the control mechanisms of the interpreter. That is, it seems fair to say that the proper operation of the interpreter depends upon substantially healthy operation of the microprocessor. Proper completion by the interpreter 28 of steps 32, 33 and 34 is required by the assembly language routines subsequent to the deliberate reset for eventual polite access to the protected critical operation. When that requirement is met by express demonstration then the critical operation may be performed with greater confidence.

The second thing to be noted is that it is desirable that there be a minimum of time between the setting 35 of Flag X and the issuance 36 of the deliberate reset.

The remaining operation of the flowchart of FIG. 5 is similar to the corresponding section of the flowchart of FIG. 3. The main difference is that FIG. 5 includes a sanity check 37. The sanity check 37 is an inspection of the values of various pointers and counters that control the operation of the interpreter 28. If any of these values are outside of their permissible ranges then something is definitely wrong, and the attempt to perform the critical operation is aborted by branching to the initial power-on start-up routine 4.

Figure 6:
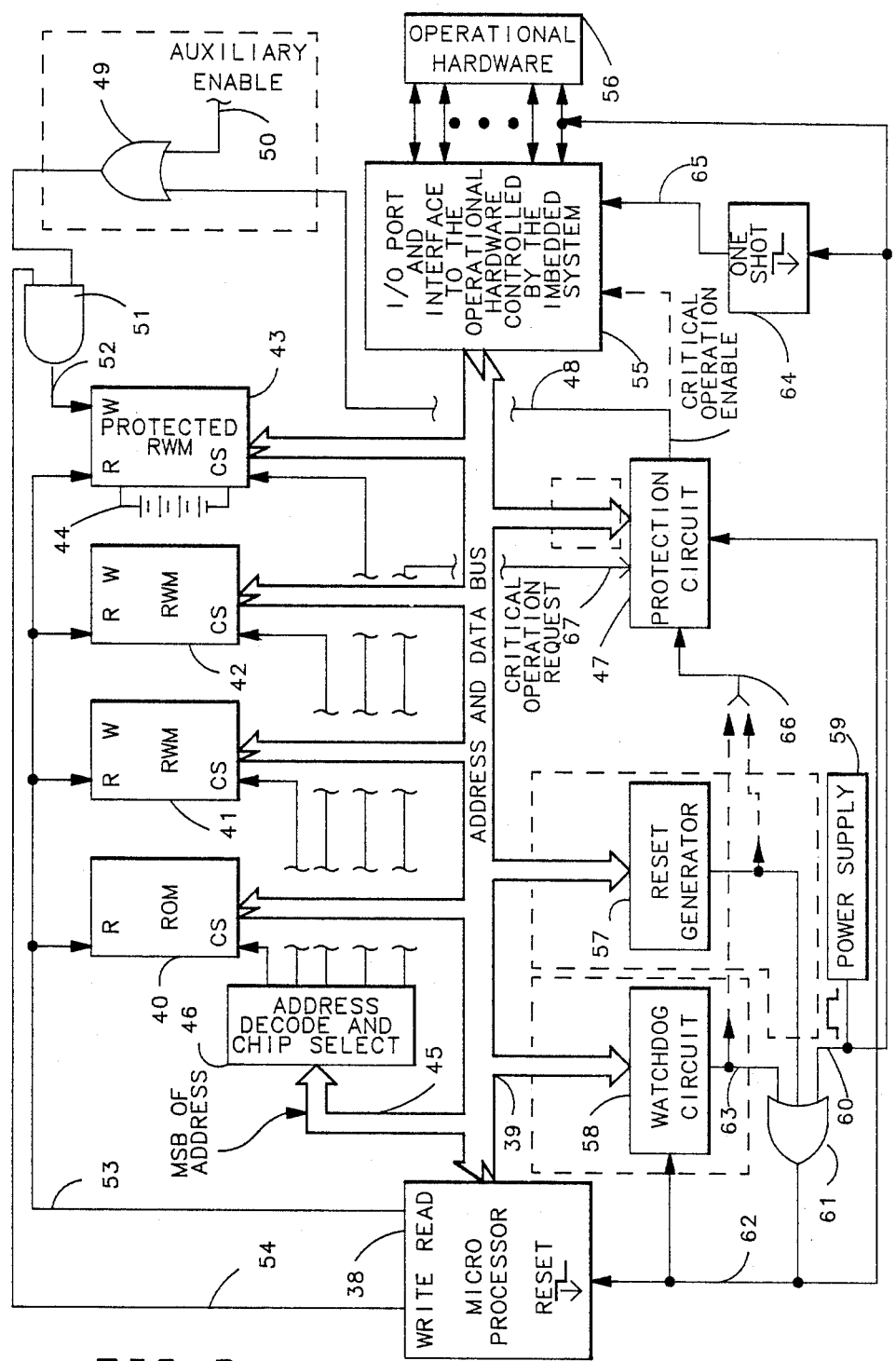
FIG. 6 is a simplified hardware block diagram of a particular implementation of the embedded system pertaining to FIG. 4, wherein the protected critical operation is the writing of calibration constants for the digital multimeter to a selected area of memory.

We turn now to the simplified block diagram of FIG. 6. This may be considered descriptive of the afore-mentioned digital multimeter in particular (although the actual "multimeter part" has been reduced to a single block), and descriptive in general of any system (whether embeded or not) wherein the critical operation to be protected is a write operation to random access memory.

According to FIG. 6, a microprocessor 38 is coupled via an addresses and data bus 39 to a variety of other elements in the system. Among these are a random access ROM 40, random access read/write memories 41 and 42 (RWM), and protected RWM 43. In the present example proteced RWM 43 is also a nonvolatile memory, and this is schematically indicated by battery 44. The fact that protected RWM 43 is non-volatile is of no particular consequence to the invention, although it is of importance to the purpose of the particular embedded system being used here as an example.

That embedded system consists principally of code to be executed by the microprocessor 38, which activity involves read and write operations to the various portions of the memory. To that end there is the usual mechanism for selecting whether a memory cycle is to perform a read operation or perform a write operation. One particular way of accomplishing that is schematically indicated by control lines 53 and 54. In further connection with memory operations a portion 45 containing the most significant address bits of the address and data bus 39 is coupled to an address decode and chip select circuit 46. The output of this circuit is a collection of chip select lines, each routed to the chip select input of the memory chip associated with the corresponding combination of most significant address bits.

The address and data bus 39 is also connected to I/O and interface circuitry 55. This serves to couple the embedded system to the actual operational hardware 56 to be controlled. In this case that operational hardware 56 comprises the measurement and calibration circuits of the aforementioned digital multimeter.

The microprocessor 38 is coupled to a reset signal 62 produced by an OR gate 61. One input to the OR gate 61 is the output of a so-called watchdog circuit 58. Watchdog circuit 58 is coupled to the address and data bus 39 for the purpose of issuing a reset to the microprocessor 38 should it appear that one or more aspects of bus activity is abnormal. This may be done in a variety of ways. In the present example the principal active ingredient of the watchdog circuit 58 is a restartable one shot (not shown). Normally executing firmware in the embedded system continually restarts the one shot before it has the chance to transition of its own accord. If the one shot ever does transisiton of its own accord (say, because the microprocessor 38 is "stuck") a signal 63 is produced. This signal is applied as an input to OR gate 61, and hence resets the microprocessor 38. Such a watchdog circuit, per se, is conventional. It is shown here because it is useful in an embedded system of the sort to which the invention pertains, and because it cooperates nicely with the invention. For this reason, the presence in FIG. 6 of the watchdog circuit 58 is optional, and is shown contained within a dotted line box.

There may optionally be also included a reset generator circuit 57. It will be recalled that the invention involves generating a deliberate reset for the microprocessor. That can be done several ways, among which are the inclusion of a dedicated circuit such as reset generator 57. The idea is that reset generator 57 is responsive to a selected set of conditions on the address and data bus 39 (e.g., a memory cycle to a particular address not used as part of physical memory). Since there are other ways to effect a deliberate reset under embedded system control, reset generator 57 is shown within dotted lines to indicate that its particular presence is optional. For example, one other way to generate the desired deliberate reset is to take advantage of the presence of the watchdog circuit 58. If the embedded system desires to generate a deliberate reset it simply declines to restart the one shot; that causes the watchdog circuit 58 generate the needed reset.

It will also be recalled that it is necessary for the firmware to determine during the execution of the code caused by the reset whether or not that reset was done deliberately as part of a polite attempt to perform the protected critical operation. Assuming the absence of a separate reset generator 57 and the presence of the watchdog circuit 58, the decision to be made is equivalent to determining if the reset was a result of the application of AC power. To this end the power supply 59 produces a pulse 60 indicating that AC power has just been applied after an absence thereof. In addition to being applied to OR gate 61 to produce reset signal 62, signal 60 is also applied to the I/O and interface circuits 55, the operational hardware 56 (if needed there), and to a one shot 64. One shot 64 serves in the capacity of a pulse stretcher. Its output 65 is applied to the I/O and interface circuitry 55, in order that signal 65 may determine the answer to the qualifier "IS THIS RESET DUE TO A POWER-ON?" of FIGS. 2,3 and 5.

On the other hand, if the optional reset generator 57 were included, then the qualifier to be asked might instead be, "DID THIS RESET ORIGINATE WITH THE RESET GENERATOR?. " To this end the input to one shot 64 would be the output 66 of the reset generator 57, rather than the output 60 of the power supply 59, as shown.

Alternatively, if reset generator 57 were included then it would be conceivable (although not necessarily desirable) to dispense with one shot 64, in favor of simply a direct connection between the output 66 of the reset generator 57 and a protection circuit 47 to be described below. This would assign to the protection circuit 47 the task of not enabling the critical operation unless it observes that the reset originated with the reset generator 57. The disadvantage of this arrangement is that unless some qualifier in the firmware detects that the critical operation has been prevented, so that a graceful recovery can be accomplished, the firmware may erroneously proceed on the basis that the operation has been successfully performed, when in fact it has not. That could cause the embedded system to crash.

Such crashing would be avoided if the embedded system were able to determine in advance if an attempt to perform the protected critical operation will be successful. Not only would this allow the embedded system to perform a graceful recovery in the event access were denied, but it may also assist in allowing the embedded system to verify that that a supposedly allowed instance of the protected critical operation did in fact take place. Here are some things to note in connection with these inquiries by the embedded system. Even if a reset generator 57 is directly coupled to the protection circuit 47, one shot 64 or some equivalent mechanism, driven by the output of reset generator 57, may still be desirable. Such an arrangement would allow the embedded system to make decisions about what the protection circuit 47 will supposedly do. Next, to allow the embedded system to test for the presence or absence of the critical operation enable signal 48, it may be desirable for that signal 48 to also be coupled to the I/O port and interface circuitry 55. In this way it could serve as the controlling condition for a qualifier asked in the firmware. Furthermore, it should not be overlooked that there may well be empirical ways to check for an enabled condition and for whether or not a previously performed critical operation actually occurred. In the case of the block diagram of FIG. 6 and its associated embedded system for the Hewlett Packard 3457A Digital Multimeter, the firmware performs an advance series of reads and writes to determine if RWM 43 can actually be written to. It is also clear that a freshly written series of calibration constants can be read back to see if they are truly what they ought to be. Finally, after the completion of the protected critical operation the supposed disablement thereof can be verified both by the use of a firmware qualifier responsive to critical operation enable signal 48 (if signal 48 goes to circuitry 55) and (where the protected sensitive operation is a write to a memory) by empirical testing of the responsiveness of that memory.

The optional alternatives previously discussed above may be partially summarized by observing that the preferred embodiment, as described in connection with FIGS. 2, 3, 5 and 6 (and absent reset generator 57) incorporates the following argument. If there was a reset, then it was caused by either the watchdog circuit 58 or the power supply 59. If it wasn't the power supply 59 then it had to be the watchdog circuit 58. A delibrate reset by declining to reset the watchdog one shot can be distinguished in the firmware executed following the reset by testing for the proper values of flags A and X. If the reset generator 57 is indeed present then the above argument is inadaquate, and must be replaced with another that takes into account that there are now a greater number of sources of the reset. Such an argument is not particularly complicated, but exactly what it would be will depend somewhat upon the implementation.

We turn now to the protection circuit 47. It corresponds to the protection circuit 8 of FIGS. 2 and 3. There now follows a description of what the protection circuit 47 does. (How it does it will described in connection with FIGS. 7 and 8.) First, protection circuit 47 responds to resets communicated to it by connections to signals 62 and 66. The response to a deliberate reset originating with the embedded system itelf is to commence waiting a specified interval, say, four milliseconds. At the conclusion of the four millisecond time interval a brief confirmation window of time commences. It is short in terms of execution cycle times for the microprocessor, perhaps one to five microseconds. During the confirmation window the protection circuit 47 must receive a proper confirmation stimulus from the firmware. See state 7 of FIG. 2, state 24 of FIG. 3, and state 67 of FIG. 5. The confirmation stimulus could be an instruction to perform the protected operation itself (FIGS. 2 and 3) or it could be a separate act that precedes one or more such instructions. Which to do appears to be a matter of convenience in the implementation. In the case of the Hewlett Packard 3457A Digital Multimeter the latter case obtains, and the protection circuit 47 is coupled to the address and data bus 39 so that it may receive a selected confirmation stimulus within a four microsecond confirmation window commencing precisely four milliseconds after the reset signal 63/62. In the instant example the a write operation to a particular memory address not corresponding to physical memory serves as the confirmation stimulus. Upon such confirmation the protection circuit 47 issues a critical operation enable signal 48. The critical operation enable signal 48 is issued for the length of time that instructions to perform the protected sensitive operation are allowed to be effective.

There are various possibilites pertaining to the duration of the critical operation enable 48. First, the duration could be of some definite preselected duration. This would be useful in certain simple systems wherein the enable signal 48 could function as the actual instruction. However, in many systems the issuance of instructions is a highly synchronous activity, and the critical operation enable signal 48 is best left as just that: an enable signal whose absence disables one or more instructions. Second, the critical enable signal 48 may be issued for a maximum amount of time not exceeding a selected limit, and is terminated immediately upon the occurence of any of a selected collection of circumstances. In the case of the Hewlett Packard 3457A Digital Multimeter, for example, the critical operation enable signal 48 is issued for no more than one hundred and twenty-eight microseconds, during which time a variable number of newly determined calibration constants are transferred from their temporary locations into the protected RWM 43. The enable signal 48 is withdrawn immediately by a second occurence of the confirmation stimulus or by another reset. The second occurence of the confirmation stimulus (i.e., another write to the selected address in memory) corresponds to issuing the "relock" instruction in state 68 of FIG. 5. Having this ability is useful in instances where the time required to perform the protected critical operation is not always the same, and may vary from one instance to the next. Thus, the critical operation enable signal 48 may be removed as soon as it is no longer needed. It is also clear that it is desirable to ensure that the critical operation enable signal 48 is absent whenever there is a reset; at no time immediately after a "regular" reset is it legitimate to do the protected operation. It is for this reason that reset signal 62 is also coupled to the protection circuit 47. A "regular" reset can be identified by the presence of signal 62 in the absence of signal 66. It may also be desirable for the protection circuit 47 to withdraw the critical operation enable signal 48 upon the detection of other conditions indicative of a malfunction or of an impolite or unauthorized attempt to perform the critical operation.

After the fashion of FIGS. 2 and 3 the critical operation enable signal 48 may be applied directly to an AND gate 51 to control the critical operation, as is shown in FIG. 6. (If signal 48 were the critical instruction then it is most likely that AND gate 51 could be dispensed with.) In the instant example of the Hewlett Packard 3457A Digital Multimeter signal 48 is truly an enable, and AND gate 51 requires the logical conjunction of the critical operation enable signal 48 with the write signal 54 in order to produce signal 52 at the write input of protected RWM 43.

That is, it is not possible to write to the protected RWM 43 except during a one hundred and twenty-eight microsecond period that begins when the critical operation enable signal 48 is issued by the protection circuit; except during that time AND gate 51 prevents write signal 54 from reaching the protected RWM 43. Protection circuit 47 will only issue the critical operation enable 48 if it receives a confirmation stimulus within a four microsecond confirmation window commencing exactly four milliseconds after the deliberate reset. The firmware in the embedded system that issues the confirmation stimulus requires that certain flags be set which ensure that various safeguards have been properly met. Random execution of that firmware will not enable writes to protected RWM 43 since it would not meet the requirement for a prior deliberate reset. If there was a prior deliberate reset the executed code requires that the trail left by the behavior before that reset be that of a polite request. After the necessary write operations to the protected RWM 43 have been completed the critical operation enable 48 is removed immediately by application of an unsolicited second confirmation stimulus.

Figure 7:
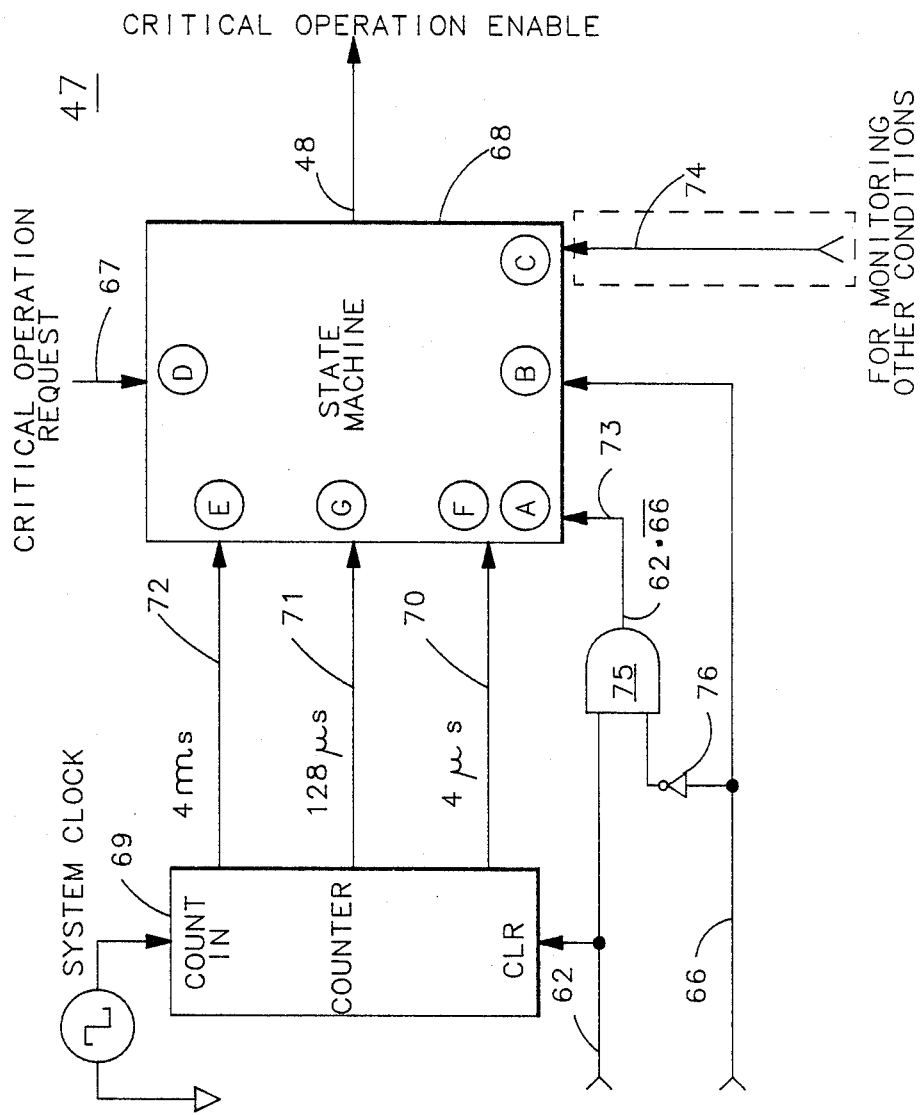
FIG. 7 is a simplified block diagram of a protection circuit used in FIG. 6.

An additional possibility deserves consideration before moving on to FIG. 7 and the internal operation of the protection circuit 47. Suppose that, for some reason, the critical operation was to be protected in terms of its accessibility from one machine, but was to be freely accessible from another. Or suppose that the operation was to be protected under some circumstances but not under selected circumstances. Either of these hypotheses can be accommodated by providing an auxiliary enable signal 50, as shown in the dotted line box in the upper right-hand corner of FIG. 6. In this optional circuit an OR gate 49 simply forms the logical disjunction of the critical operation enable signal 48 and the auxiliary enable signal 50.

FIG. 7 is a simplified block diagram of a preferred hardware embodiment of the protection circuit 47 of FIG. 6, as applied in the Hewlett Packard 3457A Digital Multimeter. The central elements of the protection circuit 47 are a counter 69 and a state machine 68. A system clock drives the counter 69, which in turn produces various outputs indicative of the ongoing passage of time since the last reset signal 62 issued to the microprocessor 38. In this particular example an output 70 produces a signal whose onset occurrs once every four microseconds. In like fashion signals 71 and 72 recur every one hundred and twenty-eight microseconds and every four milliseconds, respectively. Signals 70-72 are coupled to state machine 68, and are further identified by circled letters F, G and E, respectively. The circled letters represent events of interest to the state machine 68, and also appear in the state machine diagram of FIG. 8.

State machine 68 also receives other inputs. Input D is the request 67 to perform the critical operation. Input B is the reset signal 66 corresponding to the deliberately programmed reset issued as part of a polite request to perform the protected critical operation. Reset signal 62, which as the actual reset signal reaching the microprocessor 38 is the logical disjunction of all reset operations, regardless of their source, is combined with deliberate reset 66 to produce an event A represented by signal 73. Event A is the occurrence of reset signal 62 in the absence of reset signal 66, and represents any reset not issued as the polite (deliberate) reset that is part of a normal request to perform the protected critical operation. Signal 73 is formed by the action of inverter 76 and AND gate 75. State machine 68 may also be responsive to a plurality of optional inputs, shown in the figure by the single optional input 74 within the dotted line box and collectively represented as event C. Event C is for monitoring other conditions that, if they occur, ought to disable the critical operation, no matter what. In the Hewlett Packard 3457A DMM, for example, event C is the firmware's hold-off instruction to the watchdog circuit 58. (This is an additional connection not shown in FIG. 6.) That hold-off instruction is issued every ten milliseconds. The hold-off instructions are synchronized to the most recent reset, in that the internal timing mechanism within the watchdog circuit is restarted by a reset, as is the timing mechanism in the firmware that maintains the ten millisecond intervals between hold-off instructions. The idea here is that if a hold-off instruction occurs during the process of issuing the critical operation enable signal 48, then something is out of whack. There shouldn't be such a signal, as it would not normally come along until ten milliseconds after a reset, while the cirirtical operation enable occurrs around four milliseconds after the reset. This inappropriate sequence of signals is an example of how conditions in the embedded system can be used to create event C.

The purpose of state machine 68 is to produce the output signal critical operation enable 48 in response to a particular sequence of events A through F. The algorithm for doing this is shown by the state machine diagram of FIG. 8. Any suitable means may be used to implement the state machine itself.

Figure 8:
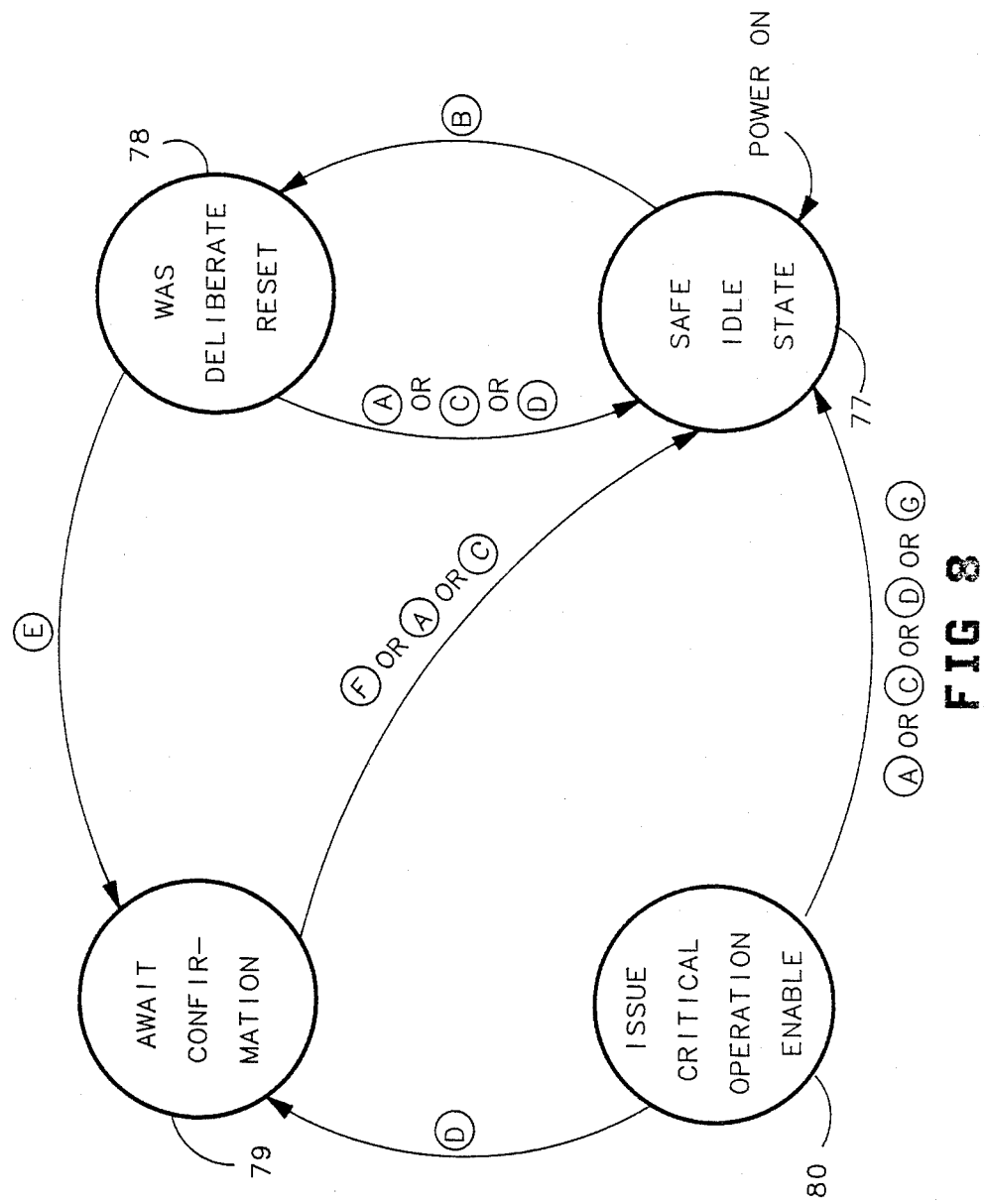
FIG. 8 is a state diagram pertaining to a state machine used in FIG. 7.

FIG. 8 illustrates the state diagram of state machine 68. As can be seen from the diagram, the state machine 68 has four states, 77-80. State 77 may be termed the SAFE IDLE state. It is to this state 77 that the state machine 68 transitions upon turn-on or upon any occurrence of events A or C, regardless of the current state of the machine 68. Referring now jointly to FIGS. 7 and 8, the occurrence of event B advances the state machine 68 from the SAFE IDLE state 77 to the WAS DELIBERATE RESET state 78. The state machine 68 waits here for four milliseconds until event E occurs, at which time the AWAIT CONFIRMATION state 79 is reached. The confirmation window of four microseconds is achieved in that, unless event D preceeds event F the state machine will transition back to the SAFE IDLE state 77. Timely occurrence of event D will advance the machine to state 80, ISSUE CRITICAL OPERATION ENABLE. While the state machine 68 is in this state, and only then, can the protected critical operation be performed. The state machine 68 will remain in state 80 until either of events A, C, D or G occurs. Event D (the firmware's deliberate repeating of the confirmation instruction to "close the door" when the protected critical operation is complete) is the preferred way to leave state 80 and get back to the SAFE IDLE state 77. Event G is the automatic "closing of the door" due to the passage of time. Events A or C would normally indicate that something has gone amiss.

The Preferred Method of the Invention

According to a preferred method of the invention a critical operation within a microprocessor-based embedded system is protected against accidental or unsafe performance by a protection circuit responsive to conditions within the embedded system. The protection circuit does not enable the critical operation unless: (1) the microprocessor exhibits a selected uniquely identifiable action indicating that a particular place in the code has been reached and that starts a time interval; (2) the protection circuit detects no abnormal activity subsequent to the start of, or during, the time interval; and (3) the microprocessor supplies the protection circuit with a confirmation stimulus precisely timed to occur at the end of the time interval. The uniquely identifiable action may be a self-administered reset, selfadministered interrupt or the decoding of a particular instruction issued from a particular address. In addition, and in the case where the uniquely identifiable action is a self-administered deliberate reset, the embedded system includes the means to determine, subsequent to the deliberate reset, that such reset was indeed the deliberate reset, as distinguished from resets brought about by any other causes. Such a determination causes the program executed immediately subsequent to the deliberate reset to be one that checks all necessary conditions just prior to enabling the critical operation. As a part of such activity, that program may also demand that certain multi-bit flags have proper values, indicating that the request to perform the critical operation and its surrounding conditions before the uniquely identifiable action appeared both normal and polite at that time. An interpreter implemented in the native machine language may be used as a virtual machine to accomplish various preliminaries associated with the protected critical operation. If so, it is desirable to perform a "sanity check" on the control mechanisms for the interpreter, prior to proceeding with the critical operation. Once the critical operation is enabled it may remain so for a fixed length of time, remain so until used a preselected number of times, or remain so until deliberately disabled. An untimely or extra confirmation stimulus can serve as a deliberate disable instruction. The protection circuit may monitor various events in the embedded system that ought not to occur in the vicinity of the protected critical operation. The protection circuit then denies access to the critical operation if any of these events occur. In a preferred embodiment the embedded system is capable of testing in advance whether or not the critical operation is enabled, thus allowing a graceful recovery from a failed attempt to perform the critical operation.

I claim:

1. A method, in a system controlled by a processor executing object programming, for preventing performance of an operation unless a selected control condition is satisfied, the method comprising the steps of:
   disabling the operation except at such times when it is enabled by the step of enabling the operation recited below;
   responding to a request to perform the operation by directing the processor to a particular object program location associated with such requests;
   detecting an event indicative that the processor will reach the particular location; and then
   checking with the processor the selected control condition; and then
   issuing a confirmation signal provided the selected control condition is satisfied; and
   enabling the operation in response to a confirmation signal occurring within a second time interval commencing at the expiration of a first time interval commencing with the detecting step.

2. A method as in claim 1 wherein the responding step directs the processor to a particular object program location by use of a self-administered reset and the detecting step comprises detecting the self-administered reset.

3. A method as in claim 1 wherein the responding step directs the processor to a particular object program location by use of a self-administered interrupt and the detecting step comprises detecting an acknowledgement of the self-administered interrupt.

4. A method as in claim 1 wherein the detecting step comprises detecting that a selected instruction from a particular location in the object program has been executed.

5. A method as in claim 1 further comprising the step of terminating the enabling step immediately upon detection of a selected event.

6. A method as in claim 5 wherein the selected event is an occurrence of the confirmation signal subsequent to the enabling step.

7. A method as in claim 5 wherein the selected event comprises detecting an inappropriate condition within the system.

8. A method as in claim 1 wherein the system includes a virtual machine implemented in firmware executed by the processor and further wherein the checking step comprises ascertaining that selected parameters pertaining to the operation of the virtual machine are within normal bounds.

9. A method, in a system controlled by a processor executing object programming, for preventing performance of an operation unless a selected control condition is satisfied, the method comprising the steps of:
   disabling the operation with a protection circuit except at such times when temporarily enabled by the step of enabling the operation recited below;
   implementing a virtual machine with programming executed by the processor;
   performing with the virtual machine and in response to a request to perform the operation selected preliminary actions associated with performing the operation; and then
   forcing the processor to begin execution at a known object programming location; and then
   determining with the processor if the selected control condition is satisfied;
   initiating a confirmation interval of time commencing a selected period of time after the forcing step;
   issuing from the processor a confirmation stimulus to the protection circuit if the determining step indicates that the selected control condition is satisfied; and
   enabling the operation if the confirmation stimulus occurs during the confirmation interval.

10. A method as in claim 9 wherein the forcing step comprises a self-administered reset of the processor.

11. A method as in claim 9 wherein the forcing step comprises a self-administered interrupt applied to the processor.

12. A method as in claim 9 wherein the forcing step comprises a machine instruction to branch to a particular object programming location.

13. A method as in claim 9 wherein the determining step includes the step of ascertaining that selected parameters pertaining to the operation of the virtual machine are within normal bounds.

14. A method as in claim 9 wherein the step of implementing a virtual machine implements an interpreter.

15. A method as in claim 9 further comprising the step of terminating the enabling step if a confirmation stimulus occurs outside the confirmation interval.

16. A method as in claim 9 further comprising the step of preventing the enabling step upon detecting a selected condition within the system.

* * * * *